US009243555B2

(12) United States Patent
Williams et al.

(10) Patent No.: US 9,243,555 B2
(45) Date of Patent: Jan. 26, 2016

(54) ENGINE FRONT END ACCESSORY DRIVE BRACKET

(71) Applicant: Ford Global Technologies, LLC, Dearborn, MI (US)

(72) Inventors: Rick L. Williams, Canton, MI (US); John Cornell, Shelby Township, MI (US); Thomas Polley, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 13/915,461

(22) Filed: Jun. 11, 2013

(65) Prior Publication Data

US 2014/0329630 A1 Nov. 6, 2014

Related U.S. Application Data

(60) Provisional application No. 61/820,086, filed on May 6, 2013.

(51) Int. Cl.
*F02B 67/06* (2006.01)
*F16H 7/02* (2006.01)

(52) U.S. Cl.
CPC . *F02B 67/06* (2013.01); *F16H 7/02* (2013.01)

(58) Field of Classification Search
CPC ............. F02B 67/06; F02B 67/04; F16H 7/02
USPC ............... 474/150; 123/195 A, 41.44, 65.275
See application file for complete search history.

(56) References Cited

U.S. PATENT DOCUMENTS

| 3,730,147 | A | * | 5/1973 | Buchwald | 123/41.44 |
| 5,197,423 | A | | 3/1993 | Ebesu et al. | |
| 5,216,984 | A | | 6/1993 | Shimano et al. | |
| 5,503,117 | A | * | 4/1996 | Saito | 123/41.44 |
| 5,908,017 | A | | 6/1999 | Kaneko | |
| 6,101,995 | A | | 8/2000 | Itoh et al. | |
| 6,609,491 | B2 | * | 8/2003 | Itoh et al. | 123/195 A |
| 7,954,580 | B2 | * | 6/2011 | Usoro | 180/65.275 |
| 2002/0035980 | A1 | * | 3/2002 | Itoh et al. | 123/195 A |

FOREIGN PATENT DOCUMENTS

GB 2406882 A 4/2005

OTHER PUBLICATIONS

Chastain, John et al., "Advanced Engine Cooling—Components, Testing and Observation," 6th IFAC Symposium Advances in Automotive Control, pp. 294-300, Munich, Germany, Jul. 12-14, 2010, 6 pages.

\* cited by examiner

*Primary Examiner* — Michael Mansen
*Assistant Examiner* — Robert T Reese
(74) *Attorney, Agent, or Firm* — James Dottavio; Alleman Hall McCoy Russell & Tuttle LLP

(57) ABSTRACT

A system, comprising a vehicle engine with a crankshaft, a bracket structure coupled to the vehicle engine, a thermostat positioned in the bracket structure, an accessory device coupled to the bracket structure, a water pump mounted to the bracket structure, and a drive loop coupling the accessory device and water pump with the crankshaft.

12 Claims, 5 Drawing Sheets

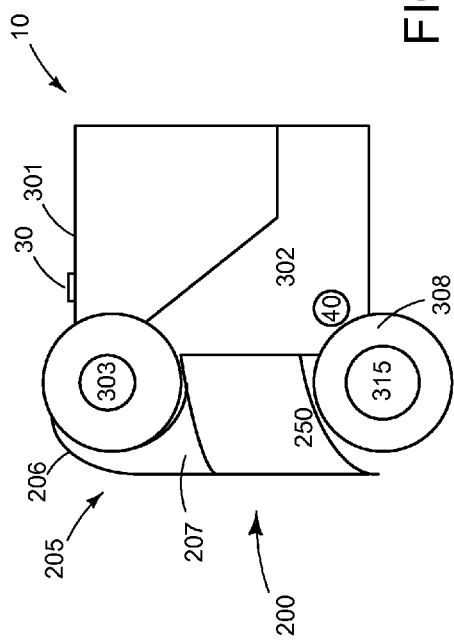
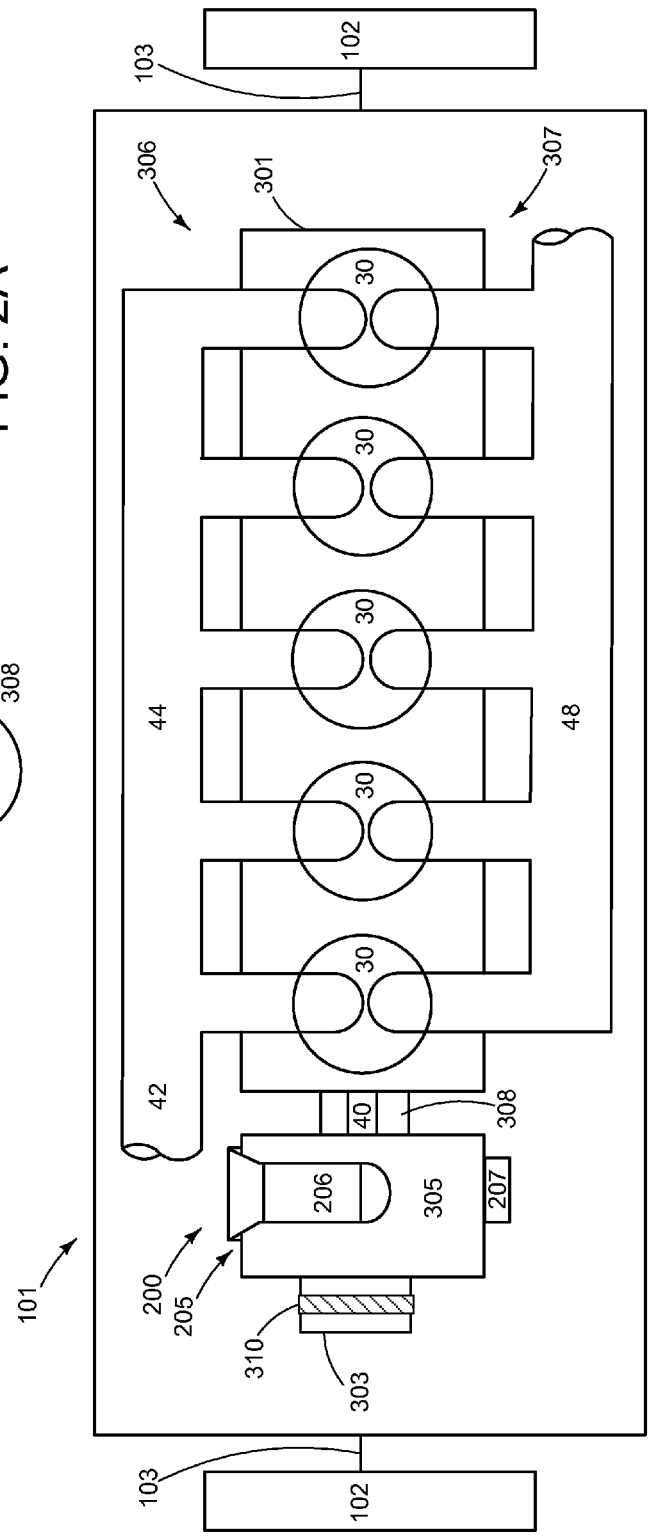
FIG. 2A
FIG. 2B

ENGINE FRONT END ACCESSORY DRIVE BRACKET

CROSS REFERENCE TO RELATED APPLICATIONS

The present application claims priority to U.S. Provisional Patent Application No. 61/820,086, filed on May 6, 2013, the entire contents of which are hereby incorporated by reference for all purposes.

BACKGROUND AND SUMMARY

Vehicle engines mount auxiliary parts, such as front end accessory devices at the front end of an engine and on a main body of the engine. A drive pulley may be coupled to the crankshaft of the engine and further coupled to the auxiliary devices through a system of drive belts and auxiliary pulleys. For example, such auxiliary parts may include an alternator for charging a battery, a water pump for supplying cooling water to the engine and other devices, a thermostat coupled to the water pump, an air conditioning compressor and an oil pump coupled to a power steering system.

The parts described above may be mounted onto an auxiliary parts bracket which is then mounted to the engine. However, vehicle packaging constraints may limit the amount of space available for the mounting bracket and accessories. In-line, transverse engines pose a significant challenge, in that the crankshaft is perpendicular to the longitudinal-axis of the vehicle. For engines of this sort with five or six cylinders, the space remaining to couple an auxiliary parts bracket is significantly less than for longitudinal engines.

The inventors herein have recognized in this type of configuration, mounting all of the auxiliary parts on the outside of the mounting bracket may be impractical. Further, space available on the cylinder head for mounting a parts bracket may be ill-suited for mounting bolts and bosses typically used for coupling the mounting bracket to the engine.

In one example approach, a system is provided. The system comprises a vehicle engine with a crankshaft; a bracket structure coupled to the vehicle engine; a thermostat positioned in the bracket structure; an accessory device coupled to the bracket structure; a water pump mounted to the bracket structure; and a drive loop coupling the accessory device and water pump with the crankshaft. In this way, the accessory device may be mounted off the engine front end, thereby enabling improved packaging.

In another example approach, a drive system for a vehicle engine, comprises; a drive pulley coupled to the crankshaft of the engine, at least one drive belt for connecting the drive pulley to a plurality of accessory pulleys, with each accessory pulley coupled to a different driven device, and a bracket structure coupled to both the vehicle engine and at least one drive belt, where the bracket structure includes mounts for the plurality of accessory pulleys and driven devices, and where the bracket structure further includes a housing for a thermostat and water pump such that the thermostat and water pump are substantially contained within the outer dimensions of the bracket structure. In this way, by mounting the thermostat and water pump within the bracket structure, less engine compartment space is needed to contain the plurality of accessories and accessory pulleys.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 2A shows a schematic diagram of front end accessory drive bracket coupled to an engine.

FIG. 2B shows a schematic diagram of an engine compartment including a cylinder head and front end accessory drive bracket.

FIGS. 3 and 4A-D are drawn to scale, although other relative dimensions may be used, if desired.

DETAILED SPECIFICATION

The following description relates to systems for a vehicle engine including a plurality of accessory devices mounted to a bracket structure coupled to the engine and driven by a drive loop coupled to the crankshaft of the engine.

Figure 1:
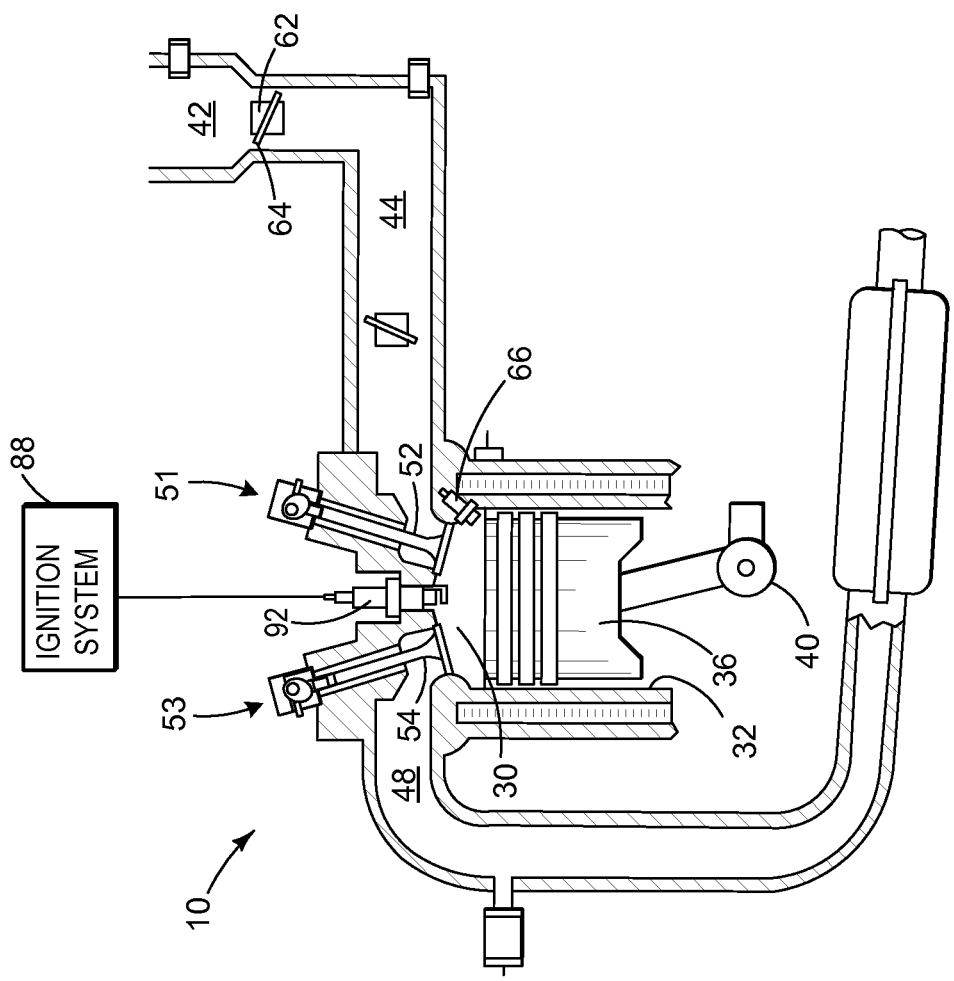
FIG. 1 shows a schematic diagram of an example internal combustion engine.

Referring to FIG. 1, it includes a schematic diagram showing one cylinder of multi-cylinder internal combustion engine 10. Engine 10 may be controlled at least partially by a control system (not shown) and by input from a vehicle operator (not shown), for example.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. As described in more detail below, crankshaft 40 may be coupled to an engine drive system via a chain, wherein a chain guide, at least part, maintains tension in the chain via a tension adjustment mechanism.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. As described in more detail below, cam actuation systems 51 and 53 may be coupled to a drive system via a chain, wherein a chain guide, at least part, maintains tension in the chain via a tension adjustment mechanism.

Fuel injector 66 is shown coupled directly to combustion cylinder 30 for injecting fuel directly therein in proportion to a pulse width signal received from a controller via an electronic driver, for example. In this manner, fuel injector 66 provides what is known as direct injection of fuel into combustion cylinder 30. The fuel injector may be mounted on the side of the combustion cylinder or on the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64 configured for electronic throttle control (ETC), which is provided as one non-limiting example. In this manner, throttle 62 may be operated to vary the intake air provided to combustion cylinder 30 among other engine combustion cylinders. Ignition system 88 may provide an ignition spark to combustion chamber 30 via spark plug 92 in response to a controller.

As described above, FIG. 1 shows only one cylinder of a multi-cylinder engine, and each cylinder may similarly include its own set of intake/exhaust valves, fuel injector, ignition system, etc. During operation, the multi-cylinder engine may undergo a four stroke cycle wherein the actuation of the crankshaft and camshafts are synchronized by an engine drive system, as described below. Further, the engine drive system may include various other accessory drives coupled to the engine drive system via one or more loops, including chains, belts, bands, etc. For example, an oil pump, balance shaft, fan, etc. may be driven by the disclosed engine drive system.

FIG. 2A shows a schematic view of a front end accessory drive (FEAD) bracket 200 coupled to engine 10 in accordance with the present disclosure. Engine 10 may include a cylinder head 301 comprising a plurality of cylinders 30 when coupled to cylinder block 302. Cylinders 30 may be coupled to crankshaft 40, allowing the energy of combustion transmitted to reciprocating motion of pistons 36 to be translated into rotational motion of the crankshaft. Crankshaft 40 may be coupled to drive pulley 315 such that rotational motion of crankshaft 40 may be translated to rotational motion of the drive pulley. Drive pulley 315 may be coupled to one or more drive belts, as described further below and in reference to FIG. 4. The one or more drive belts may be further coupled to additional pulleys and accessory devices mounted on or attached to FEAD bracket 200 as described further below and in reference to FIGS. 3 and 4. The drive belt may be coupled to alternator 305 by routing over alternator pulley 303. FEAD bracket 200 may further include a crankshaft mount 250 for securing the bracket to crankshaft housing 308. In one example, bracket 200 may be coupled to engine 10 via crankshaft mount 250, which may be secured to crankshaft housing 308. Crankshaft housing 308 includes routing for crankshaft 40 which is further coupled to drive pulley 315, which may also be included in crankshaft housing 308. Bracket 200 may be coupled to crankshaft housing 308 with a plurality of mounting bolts and mounting bosses or other suitable fasteners.

FIG. 2B shows a schematic diagram of engine compartment 101. Engine compartment 101 may include cylinder head 301, front end accessory bracket 200, crankshaft 40, crankshaft housing 308, intake manifold 44, exhaust manifold 48, alternator 305, and additional components. Engine compartment 101 may be positioned such that cylinder head 301 is directly above front axle 103.

Cylinder head 301 may be coupled to intake manifold 44 which draws air from intake passage 42 and into cylinders 30 through a plurality of intake ports and intake valves. Cylinders 30 may be further coupled to an exhaust manifold 48, which may be located internally within cylinder head 301 or externally. Cylinders 30 may export exhaust gas through a plurality of exhaust ports and exhaust valves through exhaust manifold 48. In FIG. 2B, cylinder head 301 is shown comprising 5 cylinders in a straight line orientation (it will be appreciated that this orientation may be referred to as an Inline-5 or I-5 cylinder bank). In other examples, cylinder head 301 may comprise an alternate number of cylinders, for example 4 cylinders, and may adopt a V-type or other conformation. For the inline orientation shown in FIG. 2B, the side of the cylinder head adjacent to the intake manifold may be designated as the intake side 306, and the side of the cylinder head adjacent to the exhaust manifold may be designated as the exhaust side 307. The cylinder bank may be oriented such that the long axis of the cylinder bank is perpendicular to the longitudinal axis of the vehicle (it will be appreciated that this orientation may be referred to as an east-west or transverse conformation). In another example, the long axis of the cylinder bank may be parallel to the longitudinal axis of the vehicle (it will be appreciated that this orientation may be referred to as a north-south or longitudinal conformation). In the transverse conformation, as shown in FIG. 2B, the cylinder head may be positioned within engine compartment 101 such that the cylinder head is located directly over the front axle of the vehicle in order to improve structural support for the weight of the engine.

In the example depicted in FIG. 2B, FEAD bracket 200 may be coupled to crankshaft housing 308 via secure fastening to crankshaft mount 250 as described above. In this example, no mounting bolts or mounting bosses are used to directly couple bracket 200 to cylinder head 301. In another example, bracket 200 may be coupled directly to cylinder head 301 through a plurality of mounting bolts and mounting bosses or other suitable fasteners.

Figure 3:
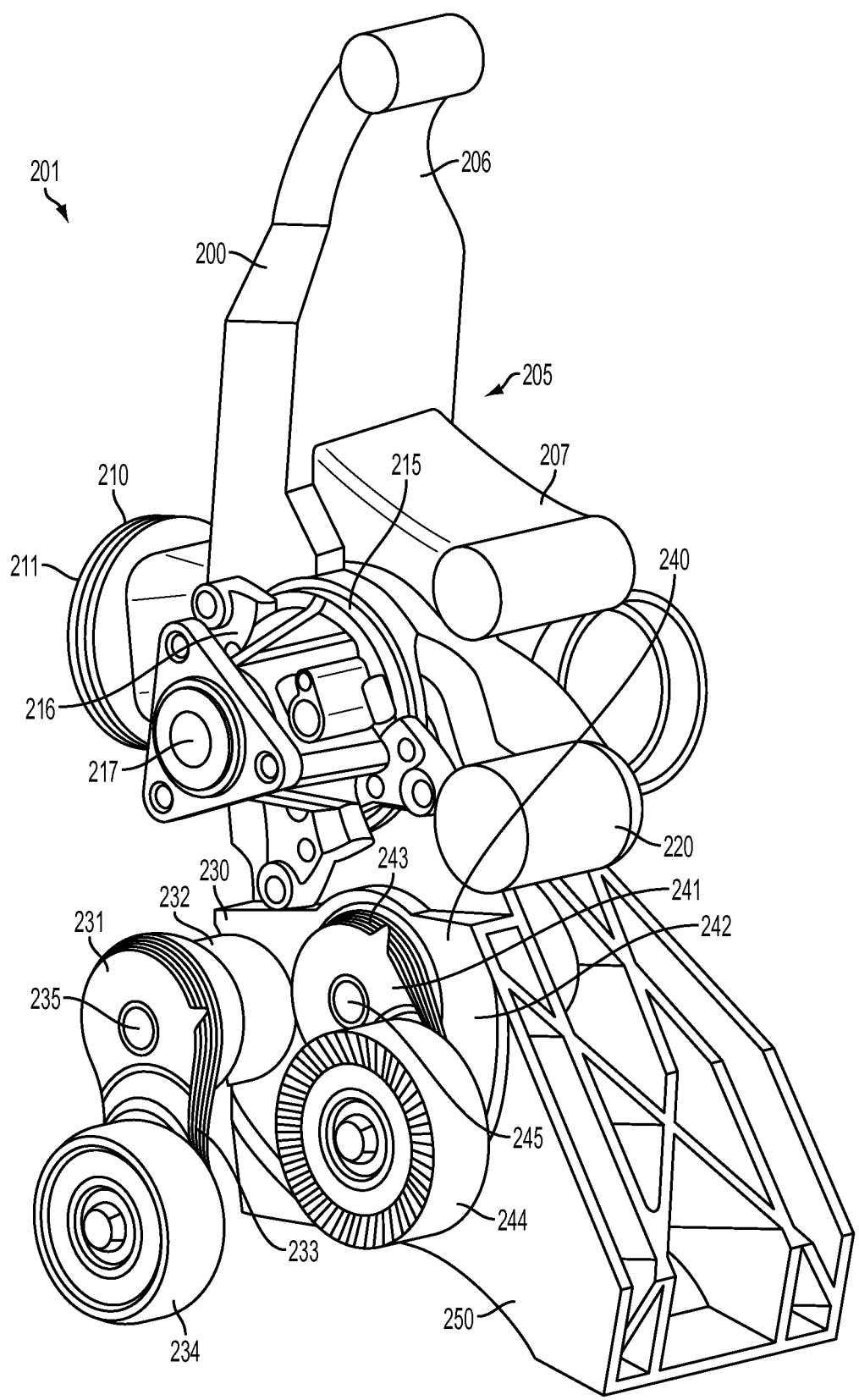
FIG. 3 shows a perspective view of a front end accessory drive bracket.

FIG. 3 shows a perspective view of a FEAD bracket assembly 201 in accordance with the present disclosure. FEAD bracket assembly 201 may include FEAD bracket 200, alternator mount 205, comprising an upper mount 206 and a lower mount 207 that may allow for the mounting of an alternator 305 to bracket 200. Mount 205 may further include a hinge or similar device situated between upper mount 206 and lower mount 207, so that the arc of mount 205 may be mechanically adjusted for the coupling of the mount 205 to alternator 305, and further adjusted to keep alternator 305 in place during operation. Alternator 305 may further include interfacing grooves, dimples, braces or similar features on its surface to engage the upper and lower mounts. In another example, alternator 305 may be fitted with mounting bosses to engage mounting bolts extending from the upper mount 206 and lower mount 207 to physically couple the alternator to the mount 205.

FEAD bracket assembly 201 may include a thermostat housing 210 and a thermostat 211 (not shown) that may be mounted within the bracket. FEAD bracket assembly 201 may include an oil pump mount 215 which may include an oil pump rotary drive shaft 217 coupled to oil pump 216. Oil pump 216 may be coupled to a power steering system via one or more oil conduits. This power steering system may be an electric power steering system. In another example, the power steering system may be a hydraulic system. Alternatively, the power steering system may be an electro-hydraulic system or a servotronic system, or may comprise other appropriate means of actuating vehicle wheels 102 in response to driver input.

FEAD bracket assembly 201 may further include an air conditioning compressor mount 230, which may allow for the placement of compressor housing 231. Compressor housing 231 may house air conditioning compressor 232. Air conditioning compressor pulley 234 may be physically coupled to compressor housing 231 as shown in FIG. 2 and may also be coupled to compressor housing 231 via compressor belt 233. Rotation of pulley 234 may cause compressor belt 233 to drive rotation of the air conditioning compressor around compressor rotational shaft 235.

FEAD bracket assembly 201 may further include a water pump mount 240, which may allow for the placement of water pump housing 241. Water pump housing 241 may house water pump 242. Water pump pulley 244 may be physically coupled to water pump housing 241 as shown in FIG. 2 and may also be coupled to water pump housing 241 via water pump belt 243. Rotation of pulley 244 may cause water pump belt 243 to drive rotation of the water pump around water pump rotational shaft 245.

Bracket assembly 200 may include one or more tensioner mounts 220. The tensioner may include a mount for a tensioner pulley or tensioner arm coupled to bracket 201. A drive belt, for example first drive belt 310, may be coupled to the tensioner as well as the drive pulley and accessory pulleys as described above. The tensioner arm may act to increase or decrease the tension of the drive belt to improve the performance of the drive belt and coupled accessories. The tensioner may include a spring or other tension generating device, and may auto-calibrate the drive belt tension (i.e. auto-tensioner) or may calibrate the drive belt tension in response to an external signal.

FEAD bracket 200 may further include a crankshaft mount 250 for securing the bracket to crankshaft housing 308. In this example, bracket 200 may be coupled to engine 10 without the use of bolts that directly couple the FEAD bracket to the cylinder block.

FEAD bracket assembly 200 may also contain mounts for other drive belt coupled accessories. Water pump mount 240 may be configured so that water pump 244 is entirely or partially within the frame of the FEAD bracket 201. Thermostat housing 210 may be configured so that thermostat 211 is entirely or partially within the frame of the FEAD bracket 201.

FEAD bracket assembly 200 may position the alternator, oil pump, water pump and compressor mounts such that when the accessories are mounted on the bracket assembly, the compressor rotary shaft is the most proximal to the crankshaft mount 250, the water pump rotary shaft is the next most proximal to mount 250, the oil pump rotary shaft is the next most proximal, and the alternator rotary shaft is the most distal to mount 250. The accessories may also be positioned in any suitable order for a given vehicle and engine configuration. For example, the water pump may be more proximal to the cylinder head than the oil pump.

FIGS. 4A-D show perspective views of an example FEAD bracket assembly 201 coupled to an alternator 305 and crankshaft housing 308 in accordance with the present disclosure. Crankshaft mount 250 may be coupled to the intake side of cylinder block 302. Crankshaft housing 308 may include crankshaft 40, as described above and in reference to FIGS. 1 and 2A. Crankshaft 40 may be coupled to drive pulley 315. Drive pulley 315 may be coupled to one or more drive belts. In this example, drive belt 315 is coupled to first drive belt 310 and second drive belt 311. The drive belts may be coupled to the drive pulley by inserting the belts into a first and second groove extending circumferentially on the surface of the drive pulley. The first and second groove may be adjacent to one another, placing the first and second drive belts on separate operational planes. Accessory pulleys coupled to the drive pulley by the first drive belt may be aligned on this first operational plane, and accessory pulleys coupled to the drive pulley by the second drive belt may be aligned on the second operational plane. Operation of engine 10 may cause crankshaft 40 to rotate, which in turn may cause drive pulley 315 to rotate. Rotation of drive pulley 315 may cause first drive belt 310 and second drive belt 312 to move and transmit the output of crankshaft 40 to the accessory pulleys mounted to the FEAD bracket.

Tensioner mount 220 is shown coupled to tensioner 321 and tensioner pulley 322. Similarly, alternator mount 205 is shown coupled to alternator 305 and to alternator pulley 303. Alternator pulley 303, tensioner pulley 322, compressor pulley 234, water pump pulley 244 and oil pump pulley 330 may all comprise grooves extending circumferentially on the surface of the respective pulley for engaging with first drive belt 310 or second drive belt 311.

In the example depicted in FIGS. 4A-D, first drive belt 310 is coupled to drive pulley 315, tensioner pulley 322, alternator pulley 303, oil pump pulley 330, and water pump pulley 244. Movement of the first drive belt will cause oil pump pulley 330 and alternator pulley 303 to rotate about their respective rotary drive shafts, and drive operation of oil pump 216 and alternator 305. Movement of the first drive belt will also cause tensioner pulley 322 and water pump pulley 244 to rotate. Rotation of water pump pulley 244 will cause water pump belt 233 to drive rotation of water pump 242 around water pump rotational shaft 235. Similarly, second drive belt 311 is depicted as coupled to drive pulley 315 and compressor pulley 234. Movement of the second drive belt will cause compressor pulley 234 to rotate. Rotation of pulley 234 may cause compressor belt 233 to drive rotation of the air conditioning compressor around compressor rotational shaft 235.

First drive belt 310 may interface with drive pulley 315, tensioner pulley 322, oil pump pulley 330, and alternator pulley 303 by contacting the pulleys with the inner surface of the drive belt. In this example, the tensioner pulley, oil pump pulley and alternator pulley will rotate in the same direction as the drive pulley. First drive belt 310 may interface with water pump pulley 244 by contacting the pulley with the outer surface of the drive belt. In this example the water pump pulley will rotate in the opposite direction as the drive pulley. Second drive belt 312 may interface with drive pulley 315 by contacting the pulley with the inner surface of the drive belt. Second drive belt 312 may interface with compressor pulley 234 by contacting the pulley with the outer surface of the drive belt. In this example the compressor pulley will rotate in the opposite direction as the drive pulley. Water pump pulley 244 and compressor pulley 234 are shown as being respectively coupled to the water pump and compressor by interacting with the inner surface of the water pump belt 243 and compressor belt 233. As such, the water pump rotary shaft will rotate in the same direction as the water pump pulley and the compressor rotary shaft will rotate in the same direction as the compressor pulley.

Figure 4A:
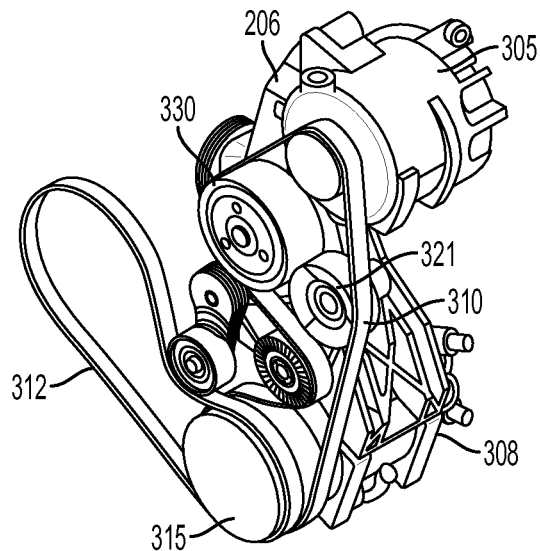
FIG. 4A shows an angled perspective view of a front end accessory drive bracket assembly mounted to a cylinder block.
Figure 4B:
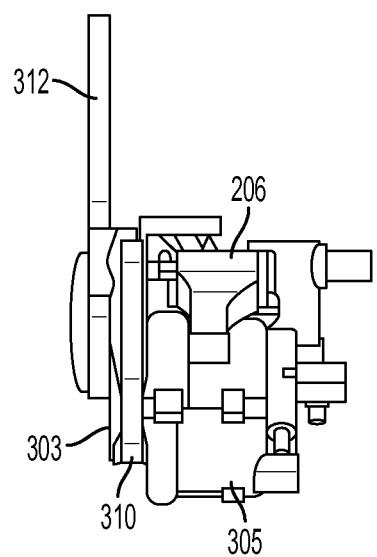
FIG. 4B shows a top-down perspective view of a front end accessory drive bracket assembly mounted to a cylinder block.
Figure 4C:
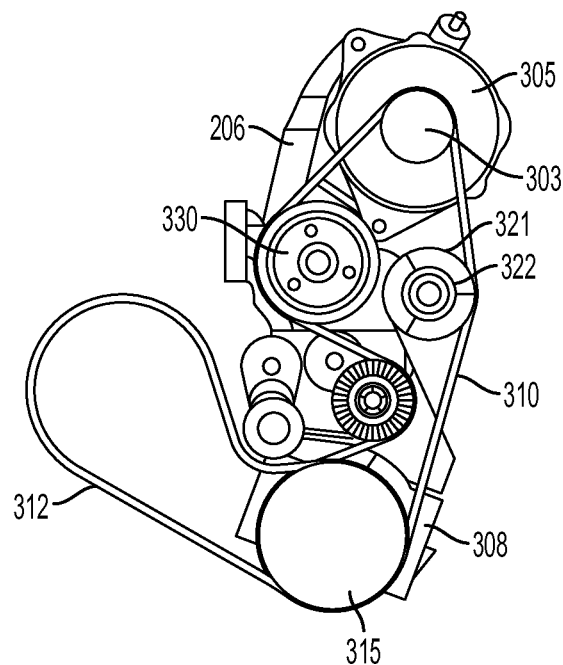
FIG. 4C shows a side perspective view of a front end accessory drive bracket assembly mounted to a cylinder block.
Figure 4D:
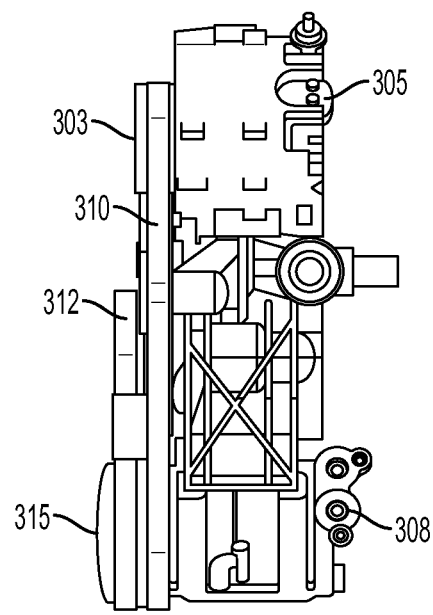
FIG. 4D shows a front perspective view of a front end accessory drive bracket assembly mounted to a cylinder block.

The first and second drive belts may contact with the plurality of pulleys with a wrap angle corresponding to an arc length of contact between the belt and each respective pulley. In the example shown in FIG. 4C, first drive belt 310 engages drive pulley 315 with a wrap angle of approximately 180°. This wrap angle may be greater than 180° (but less than 360°)

or less than 180° (but greater than 0°) depending on the tension of the first drive belt, the positioning of dependent pulleys and other factors, in such a manner that the drive pulley is able to transmit a force to the drive belt sufficient to drive the plurality of auxiliary pulleys contacting the first drive belt. In this example, the drive belt further contacts the tensioner pulley 322 with a wrap angle of approximately 90°. The wrap angle of the tensioner pulley may be adjusted by movement of the tensioner arm. An increase in the wrap angle of the tensioner pulley may be accompanied by a decrease in the wrap angle of one or more of the other pulleys contacting the first drive belt, and a decrease in the wrap angle of the tensioner pulley may be accompanied by an increase in the wrap angle of one or more of the other pulleys contacting the first drive belt. The wrap angle of the alternator pulley 303 and the oil pump pulley 330 are shown in FIG. 4C as being approximately equal to 135°, but may be equal to other angles between 0° and 360° in other examples. Water pump pulley 244 is shown as engaging first drive belt 310 with a wrap angle of 180°, but may be equal to other angles between 0° and 360° in other examples. Second drive belt 312 is shown as engaging drive pulley 315 with a wrap angle of approximately 225°, but this wrap angle may be greater than 225° (but less than 360°) or less than 225° (but greater than 0°) depending on the tension of the second drive belt, the positioning of dependent pulleys and other factors, in such a manner that the drive pulley is able to transmit a force to the drive belt sufficient to drive the plurality of auxiliary pulleys contacting the second drive belt. In this example, the drive belt further contacts the air conditioning compressor pulley 234 with a wrap angle of approximately 90°, but may be equal to other angles between 0° and 360° in other examples. A second tensioner pulley (not shown) may further engage the second drive belt and further adjust the wrap angles of the second drive belt at the drive pulley and air conditioning compressor pulley.

FEAD bracket assembly 201 may also include mounts or routing chambers that may be necessary to couple the accessories mounted to the bracket assembly to each other or other components of the engine. First and second drive belts 310 and 312 may be flexible drive belts. In another example, the first and second drive belts may be replaced by drive chains. In this example, the drive pulley and accessory pulleys may be replaced by lobed camshafts or toothed sprockets. Water pump belt 243 and compressor belt 233 may also be replaced by chains in an example where the water pump and compressor are designed to engage and be driven by a chain.

Bracket 201 may be routed to accommodate conduits for cooling water or coolant leading into and out of water pump 242. Water pump 242 may be coupled to an inlet conduit or conduits, drawing coolant from the radiator, or from a coolant supply that bypasses the radiator. The inlet conduit may deliver coolant to a pump chamber which may be positioned within water pump housing 241 or elsewhere in the bracket 201. Water pump 242 may be coupled to an outlet conduit or conduits allowing cooling water or coolant to be pumped elsewhere in bracket assembly 200 or back to the engine. Cylinder block 302 may be routed to accommodate openings for the inlet and outlet conduits. The cooling water outlet conduit may be coupled to thermostat 211. In one example, a temperature sensitive valve may be coupled to the conduit to route cooling water or coolant through the thermostat under a first condition and bypassing the thermostat under a second condition.

Cooling water outlet conduit may be coupled to alternator 305, as the alternator may generate a significant amount of heat when in operation. Alternator 305 may further include an electric terminal, and may be coupled to the battery through the terminal. Oil pump 216 may include an inlet coupled to an oil inlet conduit coupled to the oil pan, such that oil pump 216 may draw oil from the oil pan when operational. Oil pump 216 may further include an outlet coupled to an oil outlet conduit coupled to the power steering system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drive system for a vehicle engine, comprising;
a drive pulley coupled to a crankshaft of the engine;
at least first and second drive loops for connecting the drive pulley to a plurality of accessory pulleys, with each accessory pulley coupled to a different driven device, the driven devices including a water pump, oil pump, and alternator coupled to the first drive loop and a compressor coupled to the second drive loop, the compressor driven by an outer surface of the second drive loop; and
a bracket structure coupled to both the vehicle engine and the at least first and second drive loops, where the bracket structure includes mounts for the plurality of accessory pulleys and driven devices, and where the bracket structure further includes a housing for a thermostat and water pump such that the thermostat and water pump are substantially contained within the outer dimensions of the bracket structure.

2. The drive system of claim 1, where the oil pump and alternator are driven by an inner surface of the first drive loop and the water pump is driven by an outer surface of the first drive loop.

3. The drive system of claim 1, where the bracket structure is mounted to an intake side of the vehicle engine.

4. The drive system of claim 1, where an inner surface of the first drive loop is further coupled to a tensioner pulley coupled to a tensioner arm mounted on the bracket structure.

5. A structure for mounting a plurality of engine auxiliary parts on an engine, comprising;
an upper mounting portion for mounting said structure to an alternator without the use of bolts or fasteners that require penetrating an outer surface of an alternator housing;
a lower mounting portion for mounting said structure to a cylinder block of the engine via mounting bolts that couple the structure to a housing of a crankshaft;
mounts for a plurality of accessory pulleys and driven devices; and a housing for a thermostat and water pump such that the thermostat and water pump are substantially contained within the outer dimensions of the structure; and the upper mounting portion further comprises an upper and lower arm such that the upper arm may be coupled to a top of the alternator and the lower arm may be coupled to a bottom of the alternator; and the upper arm and lower arm are coupled to a hinge that allows the upper mounting portion to clamp onto the alternator.

6. The structure of claim 5, wherein the driven devices include at least the water pump, an oil pump, a compressor, and the alternator.

7. The structure of claim 5, further comprising a cooling water passage coupling the water pump to the engine and further coupling the water pump to the thermostat and alternator.

8. A front-end accessory drive system for a vehicle, comprising:
- a transverse inline-type multi-cylinder engine that includes a cylinder head and a cylinder block;
- a drive pulley coupled to a crankshaft of the engine;
- a first drive loop for connecting the drive pulley to a first group of accessory pulleys, with each accessory pulley coupled to a different driven device;
- a second drive loop for connecting the drive pulley to a second group of accessory pulleys, with each accessory pulley coupled to a different driven device;
- a bracket structure coupled to an intake side of the cylinder head and at the first and second drive loops, where the bracket structure includes mounts for the accessory pulleys and driven devices, the mounts organized such that an alternator mount is most distal to a crankshaft mount, an oil pump mount is second most distal, a water pump mount is third most distal, and a compressor mount is most proximal to the crankshaft mount;
- and where the bracket structure further includes a housing for a thermostat and water pump such that the thermostat and water pump are substantially contained within the outer dimensions of the bracket structure.

9. The system of claim 8, where the engine includes 5 cylinders.

10. The system of claim 8, where the first group of accessory pulleys are coupled to at least the water pump, an oil pump for a power steering system, and an alternator.

11. The system of claim 8, where the second group of accessory pulleys are coupled to at least a compressor for an air conditioner.

12. A structure for mounting a plurality of engine auxiliary parts on an engine, comprising:
- an upper mounting portion for mounting said structure to an alternator without the use of bolts or fasteners that require penetrating an outer surface of an alternator housing;
- a lower mounting portion for mounting said structure to a cylinder block of the engine via mounting bolts that couple the structure to a housing of a crankshaft;
- mounts for a plurality of accessory pulleys and driven devices; and
- a housing for a thermostat and water pump such that the thermostat and water pump are substantially contained within the outer dimensions of the structure,
- where the upper mounting portion further comprises an upper and lower arm such that the upper arm may be coupled to a top of the alternator and the lower arm may be coupled to a bottom of the alternator, and
- where the upper arm and lower arm are coupled to a hinge that allows the upper mounting portion to clamp onto the alternator.

* * * * *